Feb. 27, 1968        I. O. MINER        3,370,610

VALVE

Filed Sept. 10, 1964

INVENTOR
IRVING O. MINER

BY    *Dodge and Son*

ATTORNEYS 3,370,610
VALVE
Irving O. Miner, Warwick, R.I., assignor to The New York Air Brake Company, a corporation of New Jersey
Filed Sept. 10, 1964, Ser. No. 395,477
3 Claims. (Cl. 137—614.16)

This invention relates to metering valves. More particularly it relates to a metering valve which may be used to control the amount of an additive such as chlorine to be added to water flowing through a conduit into the clear well of a water treatment system. Preferably this additive flow should be controlled in accordance with the rate of flow of liquid through the conduit and the anticipated demand per unit quantity of liquid or in accordance with the residual additive content of the treated fluid and the rate of flow of the liquid.

According to this invention, the metering valve includes two rectilinearly movable valve slides arranged for movement at right angles to one another and transversely to the controlled flow path through the metering valve. Each valve slide has a rectangular port extending through it. The registration of these ports with each other is controlled by independent movement of the slides. One slide may be adjusted manually or automatically in accordance with the flow rate of the liquid to which the additive is to be added, while the other slide is positioned either manually or automatically in accordance with the desired concentration of the additive.

It is known to control flow of an additive by the action of more than one phenomenon. A particular advantage of this invention is that under normal conditions the area of the flow passage is an exact product of the positions of two control means. For instance, if one valve slide is manually adjusted to maintain a concentration of .1 part per million of chlorine, and the other control means is automatically positioned in correspondence with the flow of liquid being treated, the governing area of the flow passage will be a constant times .1 times the water flow rate. If the first control means is adjusted to maintain a concentration of .2 p.p.m., the governing area of the flow passage will be the same constant times .2 times the water flow rate. Other devices approximate constant concentration of the additive for all rates of water flow and dosage setting, but do not exactly multiply one control setting by the other control setting for all dosages and water flow rates within the range of the device. One object of this invention, therefore, is to feed an additive to a flowing liquid in proportion to the product of two controlling conditions.

A further object of this invention is to feed the full capacity of a chlorine supply machine when required by abnormal conditions even though water flow rate would limit chlorine flow to a lesser amount. For instance, if one valve slide were under the control of an automatic chlorine residual meter for maintaining said residual constant, and the other slide were positioned in any position other than its maximum position, it would not normally be possible to take care of high chlorine demand caused by reservoir turnover or other phenomena. To meet this eventuality, an extended opening is provided in the slide positioned by the residual chlorine meter. For reasons well known to those skilled in the art of automatic control, a control system is normally quite unstable when actuated by a meter having extremely slow response such as a residual chlorine meter. To overcome this difficulty, a flow meter can be provided to actuate one slide in response to flow rate. Thus the slide positioned by the residual meter will correct only in response to changes in chlorine demand. Demand changes are very slow relative to water flow changes, and stable control can be provided. During periods of low water flow but high demand, the slide positioned by the residual meter can move beyond its normal position in response to the residual chlorine meter's action and cause registration of its extended opening with the opening in the other valve slide. It can feed as much chlorine as is required to maintain the residual constant, up to the full capacity of the chlorine machine. For example, if water flow is 10% of maximum, this invention enables the feeding of up to 10 times as much chlorine as is possible with existing metering valves of the same normal rated capacity.

The invention will be described having reference to the accompaying drawing in which FIG. 1 is a plan view of the device with the cover and some other parts removed to expose the valve slides and the port controlled thereby.

Figure 1:
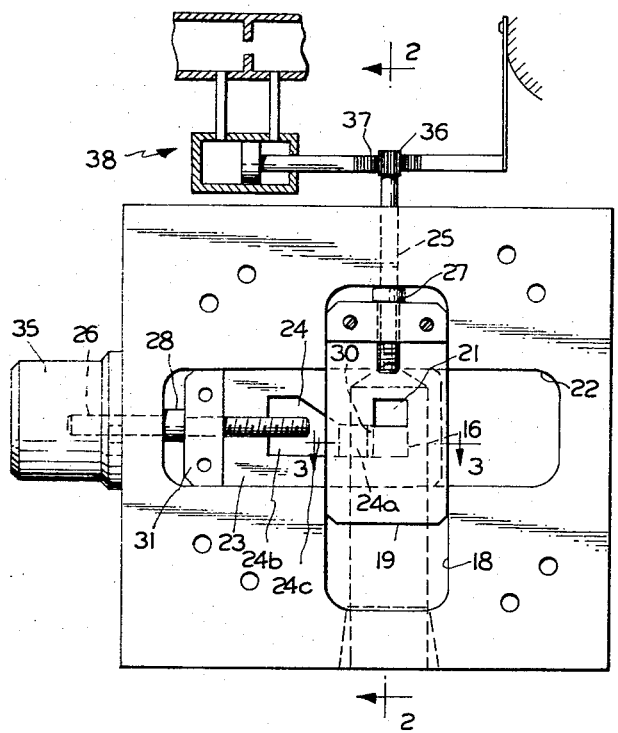
Figure 2:
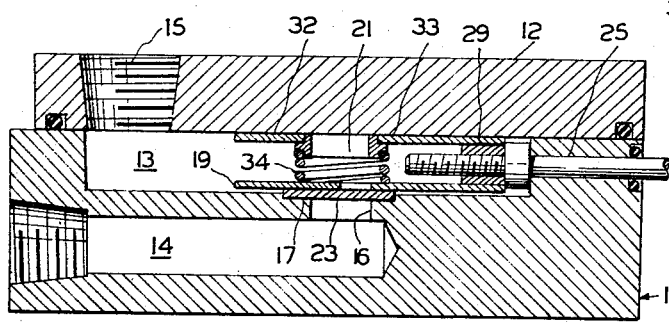
FIG. 2 is a sectional view of the valve along line 2—2 of FIG. 1, but with the cover in place.

Refer first to FIG. 2. The feeder comprises a body 11 having a cover 12. A slide valve chamber 13 is formed in body 11 and has an inlet 14. A valve chamber outlet 15 extends through cover 12. The inlet 14 communicates with valve chamber 13 through a rectangular opening 16 formed in slide valve seat 17. A first guideway 18 is formed in body 11 and has a planar bottom surface in which valve seat 17 lies. A valve slide 23 is mounted for movement along guideway 22 and has an opening 24 therethrough. Opening 24 has an end section 24b congruent with the opening 16 in the housing and an end section 24a of such size and shape that it may register fully with the lower half of opening 16 (as seen in FIG. 1). A transition section 24c lies betwen the end sections. A second valve slide 19 is movable along guideway 18 at right angles to the direction of movement of valve slide 23. An opening 21 is formed through slide 19, and this opening is congruent with end section 24a of opening 24.

Rotary actuating rods 25 and 26 are journalled in the housing 11 and held against endwise movement by collars 27 and 28. Slides 19 and 23, respectively, include threaded follower blocks 29 and 31 which are engaged by threaded portions of the actuating rods 25 and 26. A backup plate 32 overlies the slide 19 and is connected to follower block 29. This plate has an opening therein which receives spring seat 33. A compression spring 34 reacts between the spring seat 33 and the valve slide 19 and urges the slides 19 and 23 into seating engagement with each other and with the valve seat 17.

Figure 3:
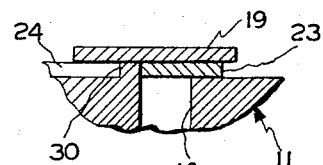
FIG. 3 is a detail sectional view on line 3—3 of FIG. 1.

In the illustrated full cut-off position, lateral leakage through opening 24 is prevented by a projecting barrier 30 (see particularly FIG. 3 and FIG. 1) which extends upward from the housing 11 into the opening 24. This barrier 30 seats against the lower face of valve slide 19. It is of such length that it completely fills end section 24a from side to side. When slide 23 is moved inward so that portion 24c registers with opening 16, there will be leakage through opening 24 to the outlet 15 but in this position of the slide such leakage is tolerable.

An adjusting knob 35 is provided on rod 26 for manual adjustment of valve slide 23. A similar knob may be mounted in rod 25. As shown, however, rod 25 carries a pinion 36 at its outer end which is engaged by a rack 37 positioned by flow rate responsive device 38. Preferably, rod 26 will also be connected for automatic actuation. It might, for example, be connected with a residual chlorine meter used to measure the residual chlorine content of the processed water. The flow rate responsive device might be in the supply line for liquid passing to the clear well and the chlorine may enter this supply line from the metering valve of the present invention.

As shown, the two slides are independently controlled. Both may be manually controlled or both may be automatically controlled, or either may be automatically controlled while the other is manually controlled.

Figure 4:
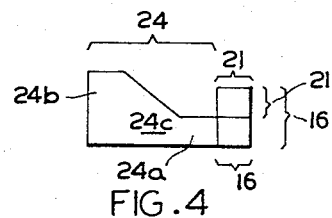
FIG. 4 is a schematic view showing the openings in the valve slides and the controlled port in full cut-off position.

Referring to FIG. 4, it will be seen that the slides may be retracted to positions in which flow is completely cut off. The opening 21 in slide 19 determines the maximum chlorine flow rate through the metering device. Adjustment of the slide 19 relative to the upper edge of end section 24a will determine what fraction of the maximum flow rate would be available if slide 23 were moved inward so that section 24a lay entirely over the opening 16. Lesser movement of slide 23 would establish intermediate flow rates. The chlorine flow rate would be proportional to the product of the fractional movements of the two slides from full cut-off to full flow positions. If each was moved halfway from cut-off, the chlorine flow rate would be one quarter of the maximum. In practice the slide 19 will be positioned in accordance with the rate of flow of the liquid treated. The slide 23 may be positioned in accordance with the desired dosage of treating reagent to the fluid being treated. The positioning can be manual, or can be automatic as by a program controller which changes the dosage with the time of day in a sewage treatment plant or industrial plant. The slide 23 may also be positioned automatically in accordance with the desired concentration of the treating reagent in the clear well.

When the demand is high, the residual chlorine content may fall below the desired value. If slide 19 is set to provide a flow rate which is only part of the maximum which can be afforded through opening 21, the metering device will by additional movement of slide 23 increase the dosage solely in response to the residual chlorine measurement. As the chlorine content falls, slide 23 moves further to the right, so that first section 24c and then section 24b come into registry with opening 21 in the partially retracted slide 19. The dosing under these conditions will not be proportional to product of flow rate and residual chlorine content, but this is not significant because the dosing device assumes this position only while the extreme demand persists and then returns to the normally operating range.

While a water treating system has been selected for illustration, this invention is equally adapted to sewage treatment, industrial process, and to control an additive to any flowable material in response to variation of two separate variables.

The inventive concept is not limited to the precise embodiment illustrated and described and no limitation to this embodiment except as may be expressed in the appended claims is intended.

What I claim is:
1. A flow metering slide valve comprising:
 (a) means defining a flow path;
 (b) a fixed slide valve seat extending across said flow path and having a rectangular port therethrough;
 (c) a first valve slide having two valve faces one seated in face to face sealing engagement on said valve seat, said slide being guided for rectilinear reciprocating movement along a path parallel with two sides of said port;
 (d) a second valve slide having a valve face seated in face-to-face engagement with the other valve face of said first valve slide, said second slide being guided for rectilinear reciprocating movement at right angles to the first slide;
 (e) a rectangular opening through the second valve slide having two sides aligned with said two sides of said port and those sides of said opening being equal in length to one-half the length of said two sides of the port;
 (f) a passage formed through the first slide and including a portion congruent with said rectangular opening, said portion having one side aligned with a third side of said port;
 (g) said slides being movable, independently of each other, between first positions in which said port, said opening and said passage are fully in register with one another and second positions from which both slides must be moved toward said first positions in order to open said flow path.

2. The combination defined in claim 1 in which said passage through the first valve slide includes:
 (a) a second portion, said second portion being congruent with said port, and having two sides which are parallel with the direction of movement of the first slide and aligned with the third and fourth sides, respectively, of said port;
 (b) said first slide being movable from its first position to a third position in which said second portion registers fully with said port and maximum flow occurs whenever the entire opening overlies any portion of said port.

3. The combination defined in claim 2 in which said passage also includes:
 (a) a transition portion between the first named portion and said second portion, the flow rate through the valve, when the first slide is in a position to cause registration between said port and the transition zone, has a minimum value established by the first slide and a maximum value established by the position of the opening, the entire opening overlying a portion of said port.

References Cited
UNITED STATES PATENTS

| | | | |
|---|---|---|---|
| 1,550,725 | 8/1925 | Jung | 251—205 |
| 3,130,247 | 4/1964 | Little | 251—212 |

FOREIGN PATENTS

| | | |
|---|---|---|
| 801,582 | 12/1950 | Germany. |
| 1,303,829 | 10/1961 | France. |

WILLIAM F. O'DEA, *Primary Examiner.*

H. COHN, *Assistant Examiner.*